(12) United States Patent
Andersen et al.

(10) Patent No.: US 8,701,481 B2
(45) Date of Patent: Apr. 22, 2014

(54) BOREHOLE SENSING AND CLAMPING SYSTEMS AND METHODS OF USING THE SAME

(75) Inventors: James Kengo Andersen, Westlake Village, CA (US); Eric Lee Goldner, Valencia, CA (US); Peter Karalskos, Simi Valley, CA (US); Agop Hygasov Cherbettchian, Santa Monica, CA (US)

(73) Assignee: US Seismic Systems, Inc., Chatsworth, CA (US)

( * ) Notice: Subject to any disclaimer, the term of this patent is extended or adjusted under 35 U.S.C. 154(b) by 393 days.

(21) Appl. No.: 13/176,210

(22) Filed: Jul. 5, 2011

(65) Prior Publication Data
US 2012/0006109 A1  Jan. 12, 2012

Related U.S. Application Data

(60) Provisional application No. 61/361,658, filed on Jul. 6, 2010, provisional application No. 61/386,612, filed on Sep. 27, 2010.

(51) Int. Cl.
*E21B 47/00* (2012.01)

(52) U.S. Cl.
USPC ..................................... 73/152.54

(58) Field of Classification Search
USPC ............... 166/206, 211, 214, 66; 73/152.45, 73/152.54
See application file for complete search history.

(56) References Cited

U.S. PATENT DOCUMENTS

| | | | |
|---|---|---|---|
| 2,846,662 A * | 8/1958 | Sparks | 367/58 |
| 3,474,539 A * | 10/1969 | Moore | 33/701 |
| 3,504,743 A * | 4/1970 | Winters | 166/214 |
| 3,683,326 A * | 8/1972 | White | 367/25 |
| 4,155,005 A | 5/1979 | Knowlton et al. | 250/205 |
| 4,255,015 A | 3/1981 | Adams et al. | 385/90 |
| 4,292,628 A | 9/1981 | Sadler | |
| 4,800,267 A | 1/1989 | Freal et al. | 250/227.16 |
| 4,826,322 A | 5/1989 | Philips | 356/614 |
| 4,879,755 A | 11/1989 | Stolarczyk et al. | 725/41 |
| 4,893,930 A | 1/1990 | Garrett et al. | 356/477 |

(Continued)

FOREIGN PATENT DOCUMENTS

| | | |
|---|---|---|
| CN | 2643296 | 9/2004 |
| CN | 101199413 | 6/2008 |

(Continued)

OTHER PUBLICATIONS

International Search Report for International Application No. PCT/US2012/051338 issued by the Korean Intellectual Property Office on Mar. 14, 2013.

(Continued)

*Primary Examiner* — Peter Macchiarolo
*Assistant Examiner* — Tamiko Bellamy
(74) *Attorney, Agent, or Firm* — Stradley Ronon Stevens & Young, LLP

(57) ABSTRACT

A sensing system configured for use in a borehole. The sensing system includes a body portion and a clamp arm engaged with the body portion. The clamp arm is configured to move between a retracted position and an extended position. The sensing system also includes an energy storage element engaged with the body portion. The energy storage element provides energy to move the clamp arm from the retracted position to the extended position. A method of using the sensing system is also provided.

20 Claims, 5 Drawing Sheets

(56) References Cited

U.S. PATENT DOCUMENTS

| | | | |
|---|---|---|---|
| 4,994,668 A | 2/1991 | Lagakos et al. | 250/227.19 |
| 5,011,262 A | 4/1991 | Layton | 385/12 |
| 5,051,799 A | 9/1991 | Paul et al. | 375/242 |
| 5,172,117 A | 12/1992 | Mills et al. | |
| 5,227,857 A | 7/1993 | Kersey | 356/477 |
| 5,367,376 A | 11/1994 | Lagakos et al. | 356/477 |
| 5,397,891 A | 3/1995 | Udd et al. | 250/227.18 |
| 5,493,390 A | 2/1996 | Varasi et al. | 356/32 |
| 5,680,489 A | 10/1997 | Kersey | 385/12 |
| 5,712,932 A | 1/1998 | Alexander et al. | 385/24 |
| 5,798,834 A | 8/1998 | Brooker | 356/477 |
| 5,986,749 A | 11/1999 | Wu et al. | 356/73.1 |
| 6,104,492 A | 8/2000 | Giles et al. | 356/454 |
| 6,157,711 A | 12/2000 | Katz | 379/265.01 |
| 6,281,976 B1 | 8/2001 | Taylor et al. | 356/480 |
| 6,328,837 B1 | 12/2001 | Vohra et al. | |
| 6,381,048 B1 | 4/2002 | Chraplyvy et al. | 398/79 |
| 6,453,022 B1 | 9/2002 | Weinman, Jr. | 379/88.13 |
| 6,654,521 B2 | 11/2003 | Sheng et al. | 385/37 |
| 6,819,812 B2 | 11/2004 | Kochergin et al. | 385/12 |
| 6,891,621 B2 | 5/2005 | Berg et al. | 356/477 |
| 6,900,726 B2 | 5/2005 | Graves | 340/531 |
| 7,013,729 B2 | 3/2006 | Knudsen et al. | 73/514.26 |
| 7,282,697 B2 | 10/2007 | Thomas et al. | 250/227.14 |
| 7,683,312 B2 | 3/2010 | Goldner et al. | 250/227.14 |
| 7,840,105 B2 | 11/2010 | Goldner et al. | 385/37 |
| 7,994,469 B2 | 8/2011 | Goldner et al. | 250/227.14 |
| 7,999,946 B2 | 8/2011 | Andersen et al. | 356/479 |
| 2002/0063866 A1 | 5/2002 | Kersey et al. | 356/478 |
| 2002/0064331 A1 | 5/2002 | Davis et al. | 385/12 |
| 2002/0064332 A1 | 5/2002 | Martin | 385/12 |
| 2003/0094281 A1 | 5/2003 | Tubel | |
| 2003/0145654 A1 | 8/2003 | Knudsen et al. | 73/488 |
| 2004/0046111 A1 | 3/2004 | Swierkowski | 250/227.21 |
| 2004/0060697 A1 | 4/2004 | Tilton | |
| 2004/0246816 A1 | 12/2004 | Ogle | 367/35 |
| 2005/0076713 A1 | 4/2005 | Knudsen | |
| 2005/0097955 A1 | 5/2005 | Berg et al. | 73/504.12 |
| 2005/0111788 A1 | 5/2005 | Tsuyama | 385/24 |
| 2006/0120675 A1 | 6/2006 | Goldner et al. | 385/104 |
| 2007/0065149 A1 | 3/2007 | Stevens et al. | 398/45 |
| 2008/0137589 A1 | 6/2008 | Barrett | 370/327 |
| 2009/0101800 A1 | 4/2009 | Goldner et al. | 250/214 LA |
| 2009/0140852 A1 | 6/2009 | Stolarczyk et al. | 340/539.1 |
| 2009/0210168 A1 | 8/2009 | Vincelette | |
| 2010/0005860 A1 | 1/2010 | Coudray et al. | 73/40.5 R |
| 2010/0219334 A1 | 9/2010 | LeGrand | |

FOREIGN PATENT DOCUMENTS

| | | |
|---|---|---|
| JP | 2001-221684 | 8/2001 |
| JP | 2006-172339 | 6/2006 |
| JP | 2007-232515 | 9/2007 |
| KR | 10-1997-0002776 | 1/1997 |
| KR | 10-2002-0008457 | 1/2002 |
| WO | 99/05493 | 2/1999 |
| WO | 2011/050227 | 4/2011 |

OTHER PUBLICATIONS

1st Office Action dated May 31, 2013 issued by the State Intellectual Property Office (SIPO) of the People's Republic of China for Chinese Patent Application No. 20180047796.6.

International Search Report for International Application No. PCT/US2010/025248 issued by the Korean Intellectual Property Office on Oct. 11, 2011.

International Search Report for International Application No. PCT/US2010/053659 issued by the Korean Intellectual Property Office on Aug. 2, 2011.

International Search Report for International Application No. PCT/US2010/053763 issued by the Korean Intellectual Property Office on Jul. 28, 2011.

International Search Report for International Application No. PCT/US2011/024465 issued by the Korean Intellectual Property Office on Oct. 27, 2011.

International Search Report for International Application No. PCT/US2011/025206 issued by the Korean Intellectual Property Office on Oct. 17, 2011.

International Search Report for International Application No. PCT/US2012/022356 issued by the Korean Intellectual Property Office on Sep. 3, 2012.

International Search Report for International Application No. PCT/US2012/028224 issued by the Korean Intellectual Property Office on Sep. 24, 2012.

\* cited by examiner

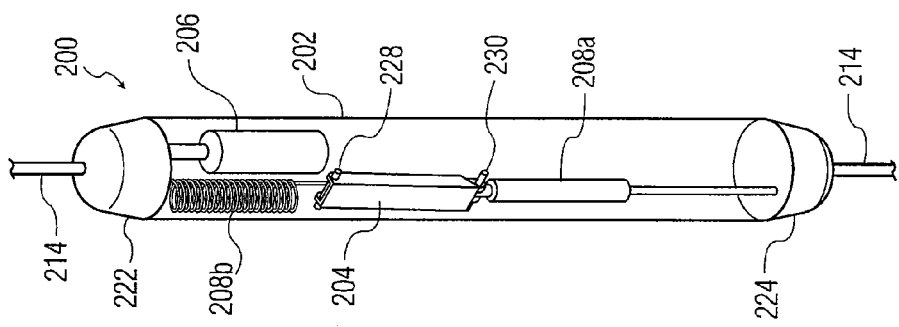
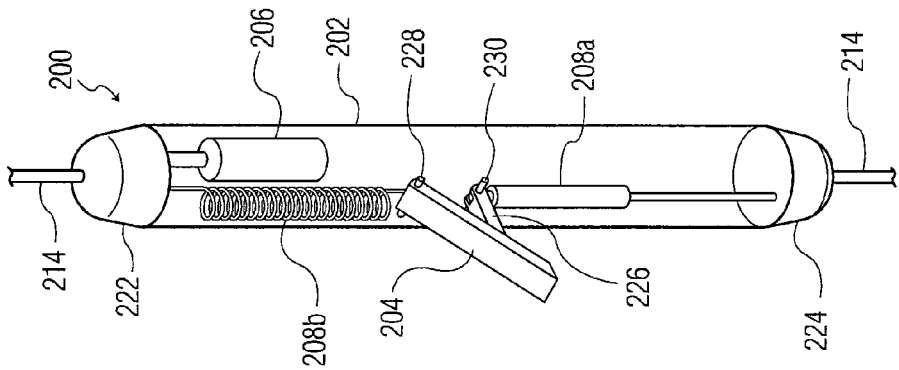
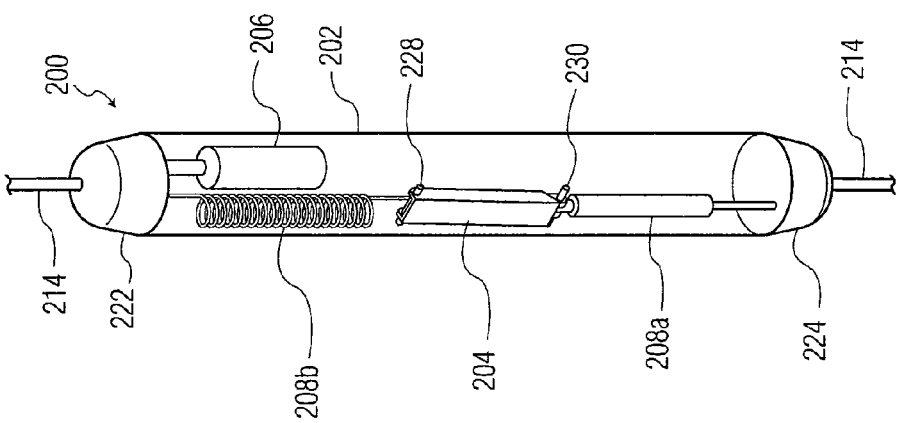

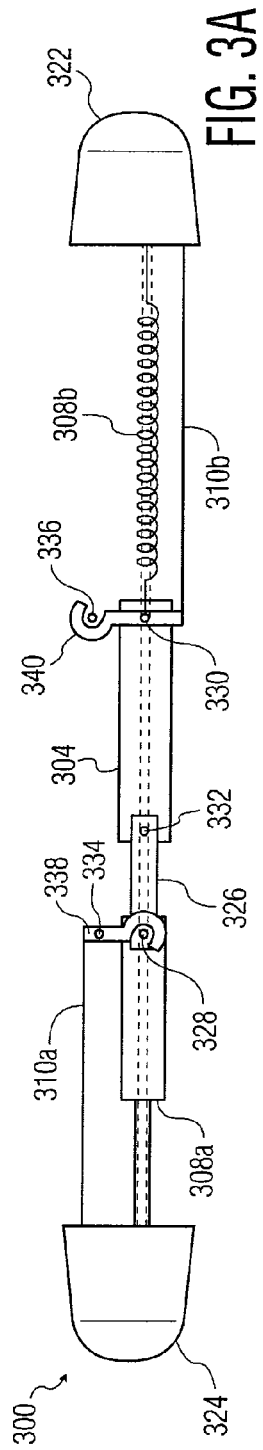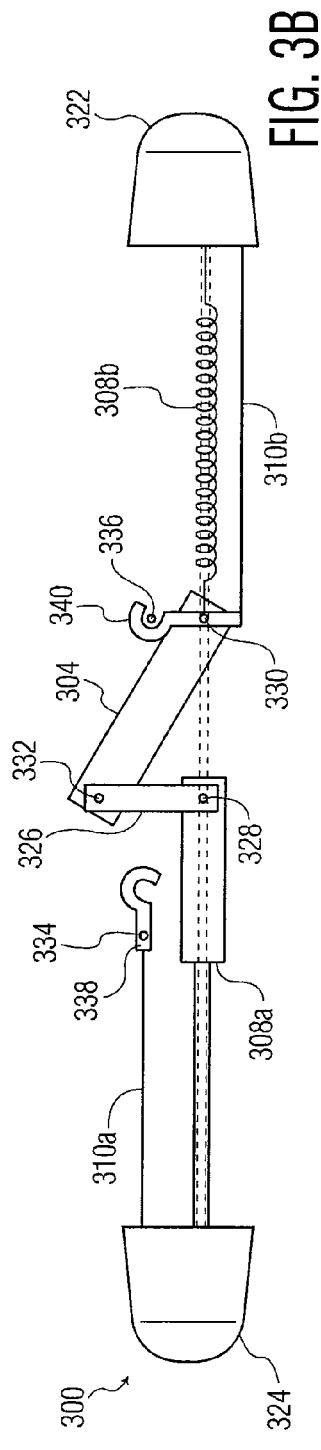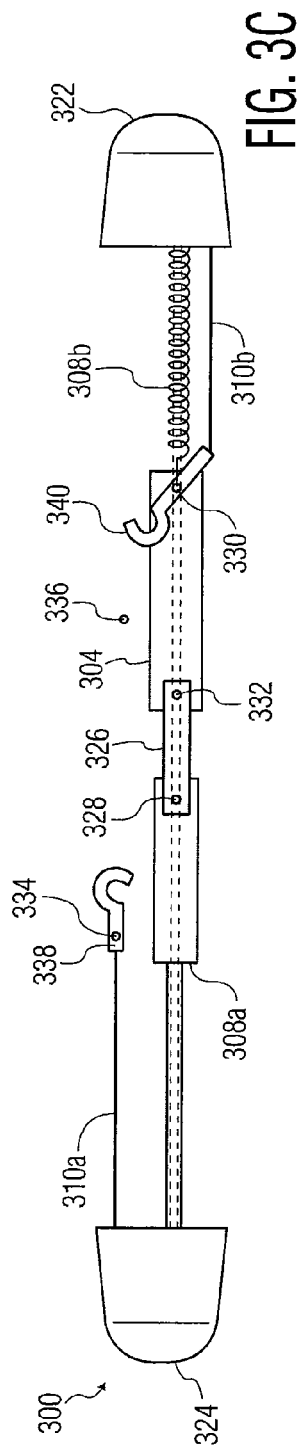

BOREHOLE SENSING AND CLAMPING SYSTEMS AND METHODS OF USING THE SAME

RELATED APPLICATIONS

This application claims the benefit of priority to U.S. Provisional Patent Application Ser. No. 61/361,658, filed on Jul. 6, 2010, and to U.S. Provisional Patent Application Ser. No. 61/386,612, filed on Sep. 27, 2010, the contents of both of which are incorporated in this application by reference.

TECHNICAL FIELD

This invention relates generally to the field of borehole sensing systems and, more particularly, to improved systems and methods for clamping a borehole sensing system in a borehole.

BACKGROUND OF THE INVENTION

Sensing devices are used in boreholes (e.g., oil wells, gas wells, observation wells, other wells, etc.) for sensing operations. Placing the sensors within a borehole has benefits over placing the sensors at or above the ground surface such as, for example, improved signal data resolution and the elimination of filtering of acoustic energy signals by the earth's weathering layer. One challenge of placing the sensors within a borehole is stabilizing the sensor within the borehole; in other words, establishing rigid mechanical coupling between the borehole and the sensor.

Attempts have been made to clamp such sensors within a borehole. One example is a remotely controlled electric motor which extends a clamp arm to lock a geophone sensor in position within the borehole. Other conventional sensors have used hydraulic motor actuators to extend and hold a clamp arm in place within a borehole. However, these conventional motorized actuators (e.g., electrical and hydraulic motor actuators) suffer from a number of deficiencies. Such deficiencies include, for example, high cost, inconsistent reliability, and technical complexity, among others. Further, such actuators require continuous power to maintain clamping force within a borehole.

Passive systems (that continuously provide clamping without actuation) such as high strength magnets and bow spring clamps have been used to secure a sensor within a borehole; however, such systems do not achieve a desired level of clamping force within the borehole, thereby resulting in suspect sensing data. Further, since these clamping systems are always engaged they create a substantial drag force (e.g., due to friction with the inside of the borehole). In order to overcome this drag force, significant weights are undesirably added to the system to pull the sensor array down through the borehole.

Thus, a need exists for, and it would be desirable to provide, improved borehole sensing and clamping systems.

BRIEF SUMMARY OF THE INVENTION

To meet this and other needs, and in view of its purposes, the present invention provides, according to an exemplary embodiment, a sensing system configured for use in a borehole. The sensing system includes a body portion and a clamp arm engaged with the body portion. The clamp arm is configured to move between a retracted position and an extended position. The sensing system also includes an energy storage element engaged with the body portion. The energy storage element provides energy to move the clamp arm from the retracted position to the extended position.

According to another exemplary embodiment of the present invention, a method of operating a sensing system is provided. The method includes the steps of: lowering a sensing system into a borehole, the sensing system including (a) a body portion, (b) a clamp arm engaged with the body portion, the clamp arm being configured to move between a retracted position and an extended position, and (c) an energy storage element engaged with the body portion; and moving the clamp arm from the retracted position to the extended position through operation of the energy storage element.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures:

FIGS. 2A, 2B, and 2C are simplified internal perspective views of a sensing system in accordance with an exemplary embodiment of the present invention;

FIGS. 3A, 3B, and 3C are simplified internal side views of a sensing system in accordance with an exemplary embodiment of the present invention.

DETAILED DESCRIPTION OF THE INVENTION

The present invention relates to improved clamping of sensing systems (e.g., in borehole applications such as oil, gas, or other types of wells) to ensure good signal coupling between the downhole sensor(s) and the structure surrounding the well. The clamping may be directly to the earth, or may be to a borehole wall such as a pipe or tube. Exemplary embodiments of the present invention provide a low cost, low drag, reliable sensing system including a clamping device that can easily be installed to rigidly (but temporarily, if desired) affix the sensing system in a desired location within a borehole. Certain exemplary clamping devices utilize remote actuation to provide a clamping force (e.g., a lateral clamping force) of greater than ten times the weight of the sensor system (e.g., the sensor housing). Once the clamping device is engaged, the sensing system desirably requires no external power (electric or hydraulic) to maintain the clamping force. Once actuated, the clamping device (i.e., a clamp arm) may include a locking device (e.g., ratcheting device) that prevents backward movement of the clamp arm to ensure that the sensing system remains locked in position despite potential degradation in spring force over time. Further, the sensing system can easily be retrieved (e.g., through remote actuation of a release of the clamping force) for repair, replacement, etc.

Figure 1A:
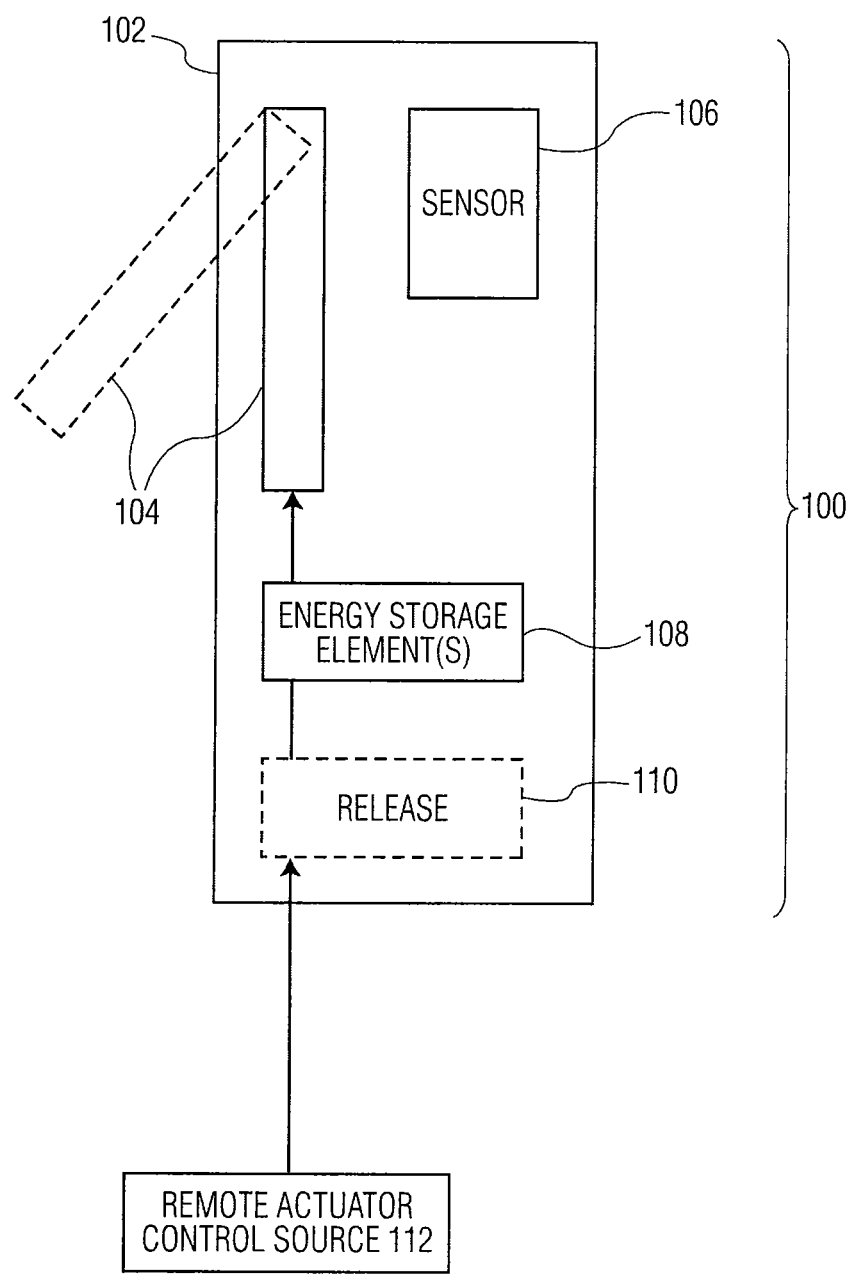
FIG. 1A is a block diagram illustrating a sensing system in accordance with an exemplary embodiment of the present invention.

Referring now to the drawings, in which like reference numbers refer to like elements throughout the various figures that comprise the drawings (and like elements may be denoted using similar numbering except for a different first reference numeral such that clamp arm 204 in FIG. 2A is analogous to clamp arm 304 in FIG. 3A, etc.), FIG. 1A is a block diagram illustrating a sensing system 100. Sensing system 100 includes one or more sensors 106. For example, sensor 106 may be a particle motion sensor (e.g., a displacement sensor, a velocity sensor, a microseismic sensor, an accelerometer such as a fiber optic accelerometer, etc), a hydrophone, etc. Further, sensing system 100 may include a plurality of sensors 106 within a single housing (e.g., X, Y, and Z directional sensors). Sensing system 100 includes a body portion 102 (e.g., a housing) and a clamp arm 104 engaged with body portion 102. Clamp arm 104 (e.g., a lever, a bow spring, etc.) is configured to move between a retracted position (shown in solid lines) and an extended position (shown in dotted lines). Sensing system 100 also includes an energy storage element 108 engaged with body portion 102. Exemplary energy storage elements 108 include spring elements (e.g., a gas spring, a tension spring, a compression spring, a torsional spring, a leaf spring, etc.), hydraulic elements, compressed gas elements, chemically reactive elements, compression material elements, etc. Energy storage element 108 provides energy to move clamp arm 104 from the retracted position to the extended position. FIG. 1A also illustrates a remote actuator control source 112 (e.g., an electrical source) configured to operate energy storage element 108 to move clamp arm 104 to the extended position. In the example shown in FIG. 1A, a release 110 (e.g., a shape memory element such as a shape memory wire) is provided within body portion 102, wherein actuation of release 110 by remote actuator control source 112 (e.g., an electrical source such as an electrical current source) enables release of energy from energy storage element 108 to move clamp arm 104 to the extended position.

Figure 1B:
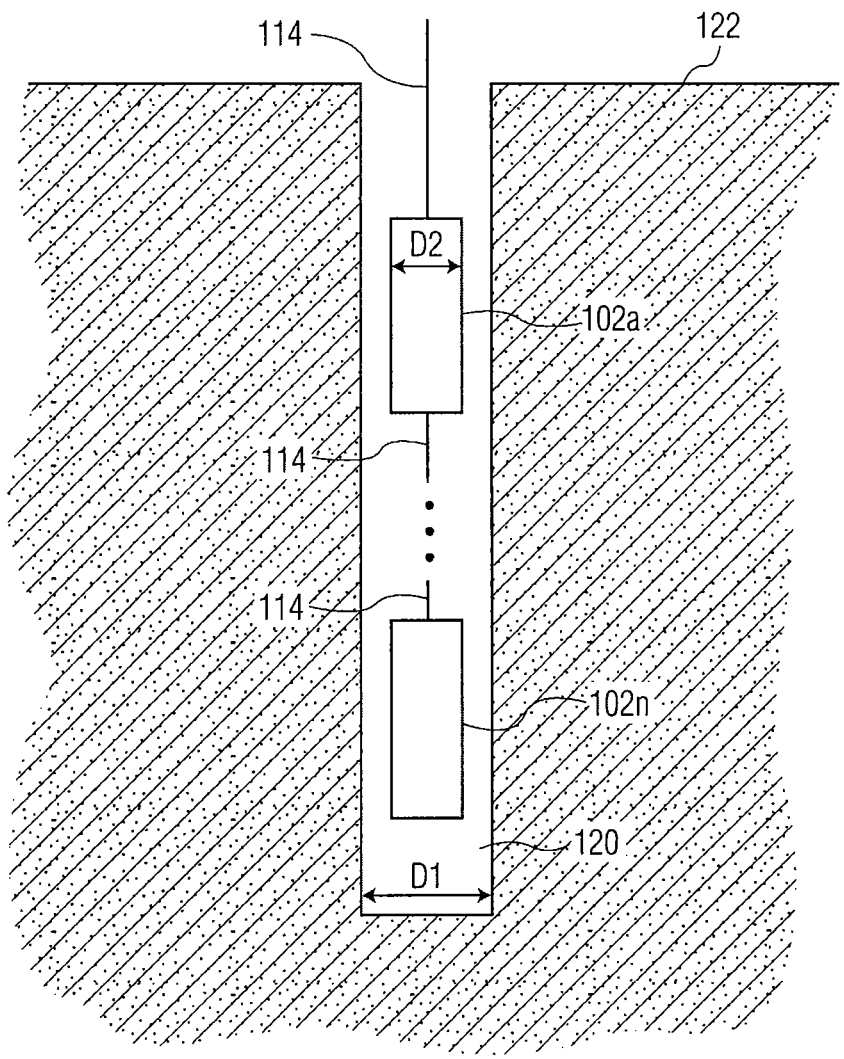
FIG. 1B is a block diagram illustrating a string of sensing systems in a borehole in accordance with an exemplary embodiment of the present invention.

FIG. 1B illustrates a borehole 120 (e.g., a well) extending into a portion of earth 122. Borehole 120 has a diameter "D1," where diameter "D1" exceeds a retracted diameter "D2" of sensor body portions 102a . . . 102n (i.e., housings). In the example shown in FIG. 1B, a plurality of sensing systems 100 (including sensor body portions 102a . . . 102n) are supported by a cable 114. Cable 114 may be a high strength cable that provides tensile strength for the entire sensor array. The sensor array, including a plurality of sensing systems 100, may be lowered into borehole 120. After the sensing systems 100 have been lowered to the desired depth within borehole 120, the clamp arm 104 of one or more of the sensing systems 100 is extended to stabilize the sensing system 100 within borehole 120.

Figure 1C:
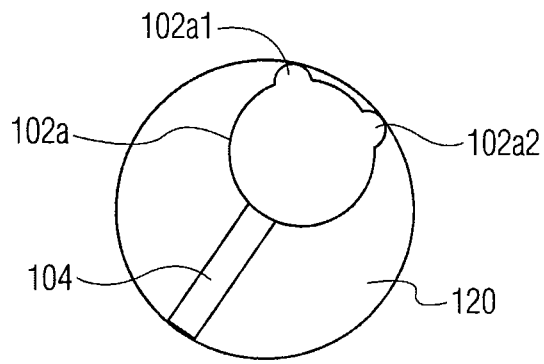
FIG. 1C is a block diagram illustrating a top view of a sensing system in a borehole in accordance with an exemplary embodiment of the present invention.

As shown in FIG. 1C, clamp arm 104 is extended such that the sensing system 100 (including body portion 102a) is stabilized in borehole 120. In this specific example, body portion 102 defines protrusions 102a1 and 102a2 such that three points of the sensing system 100 (e.g., clamp arm 104, protrusion 102a1, and protrusion 102a2) contact the wall of borehole 120 to stabilize the sensing system 100. Such a three-point mount inside borehole 120 as shown in FIG. 1C provides a stable mounting scheme that tends to provide substantially equivalent rigidity in all directions perpendicular to borehole 120, and tends to prevent rocking of the sensing system 100 that could degrade the signal being received by the sensor 106.

While FIGS. 1A, 1B, and 1C illustrate substantially block diagram views of sensing system(s) 100, FIGS. 2A, 2B, and 2C and FIGS. 3A, 3B, and 3C are illustrations of more specific exemplary implementations of the present invention; however, it is understood that the features described with the embodiments of any of the drawings may be used interchangeably as desired in the given application.

Referring specifically to FIGS. 2A, 2B, and 2C, a sensing system 200 is shown with a clamp arm 204: in an initial (i.e., first) retracted position in FIG. 2A (e.g., a position whereby sensing system 200 is configured to be lowered into borehole 120); in an extended position in FIG. 2B (e.g., a position whereby sensing system 200 is stabilized in borehole 120 for sensing operations); and in a second retracted position in FIG. 2C (e.g., a position whereby sensing system 200 is configured to be raised from borehole 120 following completion of a sensing operation(s)).

FIG. 2A illustrates sensing system 200 with a portion of a cable 214 entering into an end portion 222 (e.g., an anchor), and another portion of cable 214 leaving end portion 224 (e.g., an anchor). As will be appreciated by those skilled in the art, sensing system 200 may be part of a sensor array (e.g., a plurality of sensing systems 200 supported by cable 214) to be lowered into (and raised out of) borehole 120. Cable 214 may include, for example: (a) a support portion (e.g., structural cable) for supporting (and providing tensile strength to) the sensor array; and (b) an active wiring portion (e.g., electrical conductors for actuating shape memory elements as described below) for use in connection with moving clamp arm 204 from its first retracted position in FIG. 2A to its extended position in FIG. 2B, and to its second retracted position in FIG. 2C. Of course, the support portion and the active wiring portion of cable 214 may be integrated into a single portion as desired. A separate (or integrated) sensing cable (e.g., optical fibers for use with sensors) may also be included in the sensor array.

FIG. 2A illustrates a body portion 202 between end portions 222 and 224. Body portion 202 acts as a housing for various components of sensing system 200, some of which have been removed in FIGS. 2A, 2B, and 2C for clarity. Sensing system 200 includes at least one sensor 206 (e.g., a particle motion sensor, a hydrophone, etc.). Sensing system 200 also includes a first energy storage element 208a for moving clamp arm 204 from the first retracted position in FIG. 2A to the extended position in FIG. 2B, and a second energy storage element 208b for moving clamp arm 204 from the extended position in FIG. 2B to the second retracted position in FIG. 2C. Energy storage elements 208a, 208b may be any of a number of energy storage elements such as spring elements. In the specific implementation shown in FIGS. 2A, 2B, and 2C, energy storage element 208a is a gas spring and energy storage element 208b is a tension spring. In FIG. 2A, each of gas spring 208a and tension spring 208b is held in a "ready to be actuated" position (e.g., tension spring 208b is held in tension in FIGS. 2A and 2B until it has been actuated in FIG. 2C).

FIG. 2B illustrates gas spring 208a having been actuated (e.g., remotely actuated by operating a release) such that an arm 226 has been pushed into a position by gas spring 208a (where arm 226 is engaged with gas spring 208a through a pin 230). This position of arm 226 has forced clamp arm 204 into an extended position such that sensor system 200 is stabilized in borehole 120 (or other application) for sensing operations using sensor(s) 206. After the sensing operations are complete, tension spring 208b has been actuated (e.g., remotely actuated by operating a release) in the view shown in FIG. 2C such that clamp arm 204 has been pulled by tension spring 208b into a second retracted position (where clamp arm 204 is engaged with tension spring 208b through a pin 228). Once sensing system 200 has been brought to this second retracted position (or a plurality of such sensing systems 200 of an array have been brought into this retracted position) sensing system 200 may be raised from borehole 120 as desired.

The energy storage elements 208a, 208b shown in FIGS. 2A, 2B, and 2C may be actuated in a number of ways. FIGS. 3A, 3B, and 3C illustrate an exemplary configuration for the remote actuation of analogous energy storage elements 308a, 308b. While FIGS. 3A, 3B, and 3C describe shape memory actuation using a remote electrical signal, other actuation techniques are contemplated. Additional examples of remote actuation for releasing energy from the energy storage elements include, but are not limited to, hydraulic actuation, the melting of a fusible link, a lanyard, a squib, an acoustic release, etc.

FIG. 3A (with certain elements of sensing system 300 removed for clarity including housing walls, sensor(s), etc.) illustrates a shape memory element 310a (e.g., a shape memory wire formed of a shape memory alloy material such as a nickel-titanium alloy) engaged with a latch 338. Latch 338 secures first energy storage element 308a (e.g., a gas spring) in its "ready to actuate position" as shown in FIG. 3A. A shape memory element 310b (e.g., a shape memory wire) is engaged with a latch 340. Latch 340 secures second energy storage element 308b (e.g., a tension spring) in its "ready to actuate position" as shown in FIGS. 3A and 3B. While FIGS. 3A and 3B illustrate intermediate structures (e.g., latches 338, 340, etc.) between shape memory elements 310a, 310b and energy storage elements 308a, 308b, the present invention is not limited thereto. That is, a more direct coupling may be provided between an actuating shape memory element and a corresponding energy storage element.

In FIG. 3A, energy storage element 308a and shape memory element 310a are coupled to an end portion 324. Latch 338 is coupled to a pin 334 and is engaged with a pin 328 in the "ready to actuate" position of FIG. 3A. Pin 328 rides in a guide within sensing system 300 (shown as a pair of dotted lines in FIGS. 3A, 3B, and 3C). Pin 328 is also engaged with an arm 326. Arm 326 and a clamp arm 304 are hingedly connected by a pin 332. Energy storage element 308b and shape memory element 310b are coupled to an end portion 322. Latch 340 is engaged with a pin 336 in the "ready to actuate" position of FIG. 3B. Latch 340 is hingedly coupled to clamp arm 304 by a pin 330. Pin 330 rides in a guide within sensing system 300 (shown as a pair of dotted lines in FIGS. 3A, 3B, and 3C, which may be a different guide than the guide used for pin 328).

An electrical current is generated by an actuator control source remote from sensing system 300. The electrical current is transmitted along a cable system (not shown in FIG. 3A, 3B, or 3C). The electrical current is received by shape memory element 310a, causing heating and contraction of shape memory element 310a. The contraction of shape memory element 310a is caused by raising its temperature to an activation temperature (i.e., the temperature at which a change in the internal structure of element 310a occurs). The contraction of shape memory element 310a pulls on latch 338, thereby disengaging latch 338 from pin 328. Thus, shape memory element 310a acts as a "release" or a "trigger" for first energy storage element 308a, whereby first energy storage element 308a provides energy to push pin 328 within the guide, thereby pushing arm 326 from the position shown in FIG. 3A to the position shown in FIG. 3B. This results in clamp arm 304 moving from the first retracted position shown in FIG. 3A to the extended position shown in FIG. 3B. In this extended position shown in FIG. 3B, sensing system 300 is now stabilized in a position within borehole 120 (or other application) for sensing operations to be performed.

After the sensing operations have been completed, an electrical current is generated by an actuator control source remote from sensing system 300. The electrical current is transmitted along a cable system (not shown in FIG. 3A, 3B, or 3C). The electrical current is received by shape memory element 310b, causing heating and contraction of shape memory element 310b. The contraction of shape memory element 310b pulls on latch 340, thereby disengaging latch 340 from pin 336. This acts as a "release" or "trigger" for second energy storage element 308b, whereby second energy storage element 308b provides energy to pull pin 330 within the guide, thereby pulling clamp arm 304 from the extended position shown in FIG. 3B to the second retracted position shown in FIG. 3C. In this second retracted position shown in FIG. 3C, sensing system 300 (e.g., along with other sensing systems that may be included in a sensing array) may now be removed from borehole 120. The actuation and release of energy storage elements 308a, 308b described above in connection with FIGS. 3A, 3B, and 3C (using shape memory elements 310a, 310b along with corresponding latches and pins) is exemplary in nature. Alternative actuation and release configurations are contemplated.

Figure 4:
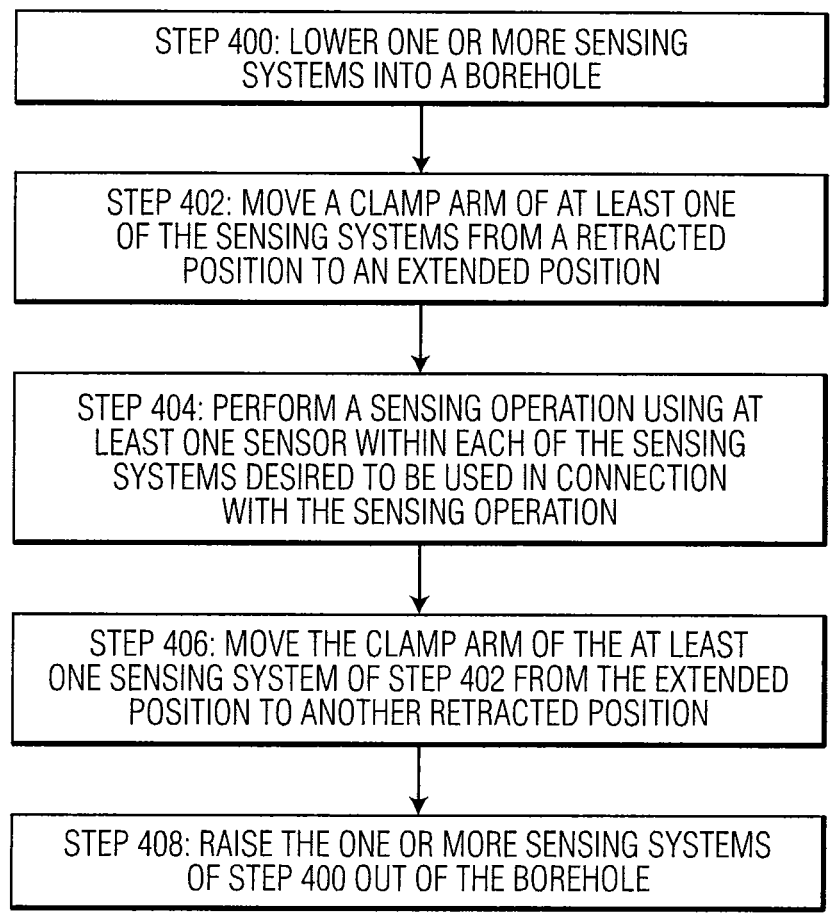
FIG. 4 is a flow diagram illustrating a method of operating a sensing system in accordance with an exemplary embodiment of the present invention.

FIG. 4 is a flow diagram illustrating a method of operating a sensing system. As will be appreciated by those skilled in the art, certain steps may be added or removed, and the order of certain of the steps may be rearranged, within the scope of the present invention. At step 400, one or more sensing systems (e.g., sensing systems 100, 200, 300 shown in any of FIGS. 1A, 1B, and 1C; 2A, 2B, and 2C; and 3A, 3B, and 3C) are lowered into borehole 120. Each of the sensing systems includes (a) a body portion, and (b) a clamp arm engaged with the body portion, the clamp arm being configured to move between a retracted position and an extended position. At step 402, the clamp arm is moved from the retracted position to the extended position through operation of an energy storage element (e.g., energy storage elements 108, 208a, 308a). At step 404, a sensing operation is performed using at least one sensor within each of the sensing systems desired to be used in connection with the sensing operation. At step 406, the clamp arm (previously moved at step 402) is moved from the extended position to another retracted position (e.g., through operation of another energy storage element such as element 108, 208b, 308b). At step 408, the one or more sensing systems (which may be integrated into a sensor array) are raised out of borehole 120.

Although the present invention has primarily been described in connection with borehole sensing applications it is not limited thereto. The teachings of the present invention are suitable for other applications such as tunneling detection (e.g., sensing systems used to detect tunneling activities such as digging) among others.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A sensing system configured for use in a borehole, the sensing system comprising:
   a body portion;
   a clamp arm engaged with the body portion, the clamp arm configured to move between a retracted position and an extended position;

an energy storage element engaged with the body portion, the energy storage element providing energy to move the clamp arm from the retracted position to the extended position; and another energy storage element, the another energy storage element providing energy to move the clamp arm to another retracted position from the extended position, the another retracted position being different from the retracted position.

2. The sensing system of claim 1 further comprising at least one of a particle motion sensor and a hydrophone within the body portion for performing sensing within the borehole.

3. The sensing system of claim 2 wherein the sensing system includes the particle motion sensor, the particle motion sensor including at least one of a displacement sensor, a velocity sensor, and an accelerometer.

4. The sensing system of claim 2 wherein the sensing system includes the particle motion sensor, the particle motion sensor being a microseismic sensor.

5. The sensing system of claim 2 wherein the sensing system includes the particle motion sensor, the particle motion sensor being a fiber optic accelerometer.

6. The sensing system of claim 1 further comprising an actuator configured for actuation from a source remote from the borehole, the actuator being configured to operate the energy storage element to move the clamp arm to the extended position.

7. The sensing system of claim 1 further comprising a shape memory element within the body portion wherein actuation of the shape memory element enables release of energy from the energy storage element to move the clamp arm to the extended position.

8. The sensing system of claim 7 wherein the shape memory element is a shape memory wire.

9. The sensing system of claim 7 wherein actuation of the shape memory element includes providing an electrical current to the shape memory element from an electrical source external from the borehole.

10. The sensing system of claim 1 wherein the energy storage element includes a spring element.

11. The sensing system of claim 10 wherein the spring element includes at least one of a gas spring and a tension spring.

12. The sensing system of claim 1 further comprising a shape memory element within the body portion wherein actuation of the shape memory element releases a latch to release energy from the energy storage element to move the clamp arm to the extended position.

13. A sensor array including a plurality of sensing systems recited in claim 1 and configured for use in the borehole, the plurality of sensing systems being supported by a cable configured to be lowered into the borehole, each of the sensing systems including a respective one of the body portion, the clamp arm, and the energy storage element.

14. A method of operating a sensing system, the method comprising the steps of:
lowing a sensing system into a borehole, the sensing system including (a) a body portion, (b) a clamp arm engaged with the body portion, the clamp arm being configured to move between a retracted position and an extended position, and (c) an energy storage element engaged with the body portion;

moving the clamp arm from the retracted position to the extended position through operation of the energy storage element; and moving the clamp arm from the extended position to another retracted position through operation of another energy storage element, the another retracted position being different from the retracted position.

15. The method of claim 14 further comprising the step of controlling an actuator remotely from the borehole to operate the energy storage element to move the clamp arm to the extended position.

16. The method of claim 14 further comprising the step of remotely actuating a shape memory element within the body portion to release energy from the energy storage element to move the clamp arm to the extended position.

17. The method of claim 14 further comprising the step of applying an electrical current remote from the borehole to a shape memory element within the body portion to release energy from the energy storage element to move the clamp arm to the extended position.

18. The method of claim 14 further comprising the step of applying an electrical current remote from the borehole to a shape memory element within the body portion to release a latch to release energy from the energy storage element to move the clamp arm to the extended position.

19. The method of claim 14 wherein the lowering step includes lowering a plurality of the sensing systems into a borehole, the plurality of sensing systems being supported by a cable lowered into the borehole.

20. The method of claim 14 further comprising the step of using at least one of a particle motion sensor and a hydrophone within the body portion for performing sensing within the borehole after the step of lowering.

* * * * *

UNITED STATES PATENT AND TRADEMARK OFFICE
CERTIFICATE OF CORRECTION

| | | |
|---|---|---|
| PATENT NO. | : 8,701,481 B2 | Page 1 of 1 |
| APPLICATION NO. | : 13/176210 | |
| DATED | : April 22, 2014 | |
| INVENTOR(S) | : Andersen et al. | |

It is certified that error appears in the above-identified patent and that said Letters Patent is hereby corrected as shown below:

On the Title Page:

Item (75) Inventors: should read:

James Kengo Andersen, Westlake Village, CA (US);
Eric Lee Goldner, Valencia, CA (US);
Peter Karaiskos, Simi Valley, CA (US);
Agop Hygasov Cherbettchian, Santa Monica, CA (US)

Signed and Sealed this
Eighth Day of July, 2014

Michelle K. Lee
*Deputy Director of the United States Patent and Trademark Office*